United States Patent [19]

Moser et al.

[11] 4,046,502
[45] Sept. 6, 1977

[54] BASIC DISAZO DYES HAVING TWO 2-HYDROXY-3-SUBSTITUTED CARBAMOYLNAPHTHYL-1-AZOPHENYL GROUPS FOR DYEING PAPER

[75] Inventors: Helmut Moser, Reinach; Hans von Tobel, Riehen, both of Switzerland

[73] Assignee: Sandoz Ltd., Basel, Switzerland

[21] Appl. No.: 641,485

[22] Filed: Dec. 17, 1975

Related U.S. Application Data

[60] Division of Ser. No. 418,451, Nov. 23, 1973, abandoned, which is a continuation of Ser. No. 95,336, Dec. 4, 1970, abandoned.

[51] Int. Cl.² ............................................. D21H 1/46
[52] U.S. Cl. ............................................. 8/7; 8/41 R; 8/41 A; 8/49; 8/54.2; 8/177 AB; 260/146 R; 260/146 D; 260/147; 260/152; 260/154; 260/155; 260/156; 260/157; 260/158; 260/160; 260/165; 260/174; 260/175; 260/178; 260/179
[58] Field of Search .......................... 8/7, 41 R, 54.2

[56] References Cited

U.S. PATENT DOCUMENTS

| 3,467,645 | 9/1969 | Keller et al. ...................... 260/174 |
| 3,555,004 | 1/1971 | Mueller et al. .................... 260/181 |

FOREIGN PATENT DOCUMENTS

| 595,806 | 4/1960 | Canada |
| 8,085 | 7/1962 | Japan |

*Primary Examiner*—Joseph L. Schofer
*Assistant Examiner*—A. L. Clingman
*Attorney, Agent, or Firm*—Gerald D. Sharkin; Richard E. Vila; Melvyn M. Kassenoff

[57] ABSTRACT

Azo dyes of the formula

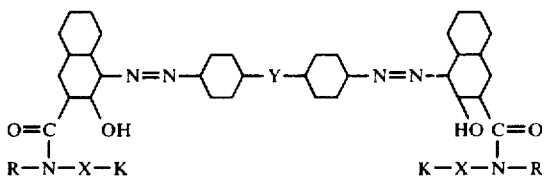

wherein
X represents a direct bond or a divalent radical,
Y represents a direct bond, an alkylene radical, —S—, —O—, —NH—CO—NH— or —CH=CH—,
R represents a hydrogen atom or a hydrocarbon radical and
K represents a primary, secondary or tertiary amino group or an ammonium, hydrazinium or a cycloimmonium group which are useful for dyeing fibers and textiles of polyacrylonitrile or acrylonitrile copolymers and for the dyeing of paper.

18 Claims, No Drawings

BASIC DISAZO DYES HAVING TWO 2-HYDROXY-3-SUBSTITUTED CARBAMOYLNAPHTHYL-1-AZOPHENYL GROUPS FOR DYEING PAPER

This application is a division of appliation Ser. No. 418,451, filed Nov. 23, 1973 and now abandoned, which in turn is a continuation of application Ser. No. 95,336, filed Dec. 4, 1970 and now abandoned.

The invention relates to a process for dyeing or printing on paper and to a process for dyeing, padding and printing on textile material, which consists of acrylonitrile polymers or copolymers or contains the same, with dyestuffs or with mixtures of dyestuffs of the azo series, characterized in that, for this purpose, there are used dyestuffs of the following formulae:

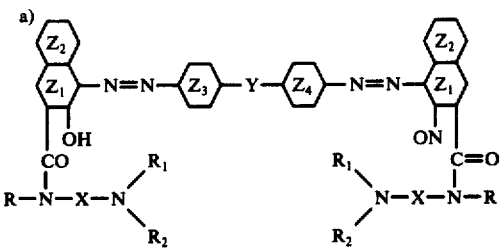

(I), wherein

X represents a direct bond or a divalent radical,

Y represents a direct bond, an optionally substituted alkylene radical, —S—, —O—, —NH—CO—NH— or —CH=CH—, and R, $R_1$ and $R_2$ respectively represent a hydrogen atom or an optionally substituted hydrocarbon radical, the aromatic rings $Z_1$ to $Z_4$ can be further substituted and the radicals $R_1$ and $R_2$, together with the adjacent N-atom, can form a saturated or partially saturated heterocyclic radical;

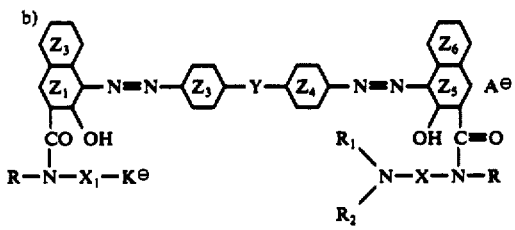

(II), wherein

X represents a divalent radical, $A^\ominus$ represents an anion equivalent to the dyestuff cation and $K^\ominus$ represents a hydrazinium, ammonium or cycloimmonium radical, and the aromatic rings $Z_1$ to $Z_6$ can be further substituted and R, $R_1$, $R_2$, X and Y have the meanings indicated under a);

(III),

-continued

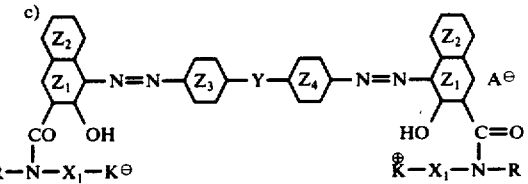

wherein R, $Z_1$ to $Z_4$, $X_1$, Y, $A^\ominus$ and $K^\ominus$ have the meanings mentioned under (a) and (b).

The invention is further concerned with azo dyestuffs of the formula

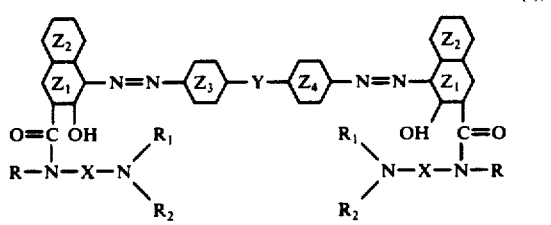

(I), wherein

X is a direct bond or a divalent radical,

Y is a direct bond, an optionally substituted alkylene radical, —S—, —O—, —NH—CO—NH—or —CH=CH—, and R, $R_1$ and $R_2$ are respectively a hydrogen atom or an optionally substituted hydrocarbon radical, the aromatic rings $Z_1$ to $Z_4$ can be further substituted and the radials $R_1$ and $R_2$, together with the adjacent N-atom, can form a saturated or partially saturated heterocyclic radical.

The invention further relates to azo dyestuffs of the formula

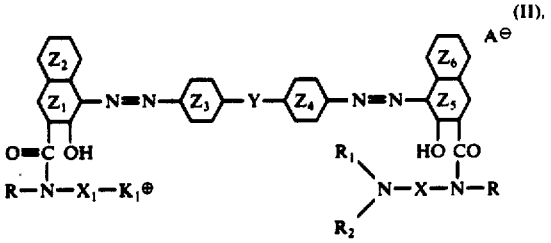

(II), wherein $X_1$ is a divalent radical,

X is a direct bond or a divalent radical,

Y is a direct bond, an optionally substituted alkylene radical, —S—, —O—, —NH—CO—NH— or —CH=CH—, R, $R_1$ and $R_2$ are optionally a hydrogen atom or an optionally substituted hydrocarbon radical, $A^\ominus$ is an anion equivalent to the dyestuff cation and $K_1^\ominus$ is a group of the formula

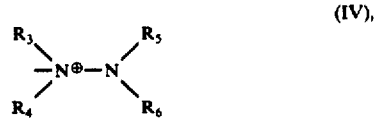

(IV), (V),

-continued

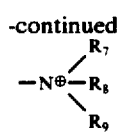
(VI)

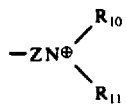

or

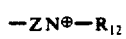
(VII)

wherein
- $R_3$ stands for an optionally substituted alkyl or or cycloalkyl radical or, together with $R_4$ and the adjacent N-atom, for a heterocyclic radical,
- $R_4$ stands for an optionally substituted alkyl or cycloalkyl radical or, together with $R_3$ and the adjacent N-atom, for a heterocyclic radical,
- $R_5$ and $R_6$ respectively stand for a hydrogen atom or for optionally substituted alkyl or cycloalkyl radicals which are the same or different from one another,
- $R_7$ and $R_8$ respectively stand for an optionally substituted hydrocarbon radical,
- $R_9$ stands for an optionally substituted alkyl or cycloalkyl radical,
- $R_{10}$ stands for an optionally substituted hydrocarbon radical,
- $R_{11}$ stands for an amino group or for an optionally substituted hydrocarbon radical, R
- $R_{12}$ stands for an optionally substituted hydrocarbon radical,
- Z stands for a carbon or nitrogen atom,
- $R_3$ together with $R_5$ and/or
- $R_4$ together with $R_6$ and the N-atoms adjacent the substituents,
- $R_7$ and $R_8$ or
- $R_7$, $R_8$ and $R_9$, together with the N-atom, can form heterocyclic radicals and the group of formula (VI) represents the radical of a multi-membered, saturated or partially saturated and possibly further substituted ring and the group of formula (VII) represents the radical of an unsaturated and optionally substituted ring, the radicals $R_1$ and $R_2$, together with the adjacent N-atom, can form a saturated or partially saturated heterocyclic radical and the aromatic rings $Z_1$ to $Z_6$ can be further substituted, The invention is still further concerned with azo dyestuffs of the formula

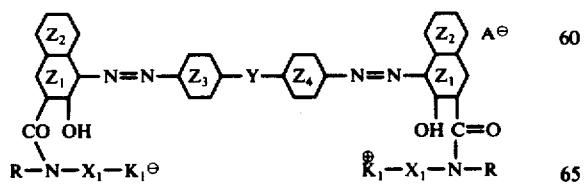
(III), wherein
$X_1$ is a divalent radical,

Y is a direct bond, an optionally substituted alkylene radical, —S—, —O—, —NH—O—NH— or —CH=CH—, $A^\ominus$ is an anion equivalent to the dyestuff cation and $K_1^\ominus$ is a group of the formula

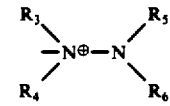
(IV),

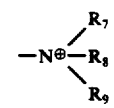
(V),

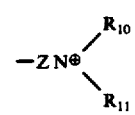
(VI)

or

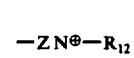
(VII)

wherein
- $R_3$ stands for an optionally substituted alkyl or cycloalkyl radical or, together with $R_4$ and the adjacent N-atom, for a heterocyclic radical,
- $R_4$ stands for an optionally substituted alkyl or cycloalkyl radical or, together with $R_3$ and the adjacent N-atom, for a heterocyclic radical,
- $R_5$ and $R_6$ respectively stand for a hydrogen atom or for optionally substituted alkyl or cycloalkyl radicals which are the same or different from one another,
- $R_7$ and $R_8$ respectively stand for an optionally substituted hydrocarbon radical,
- $R_9$ stands for an optionally substituted alkyl or cycloalkyl radical,
- $R_{10}$ stands for an optionally substituted hydrocarbon radical,
- $R_{11}$ stands for an amino group for an optionally substituted hydrocarbon radical,
- $R_{12}$ stands for an optionally substituted hydrocarbon radical,
- Z stands for a carbon or nitrogen atom,
- $R_3$ together with $R_5$, and/or
- $R_4$ together with $R_6$, and the N-atoms adjacent the substituents,
- $R_7$ and $R_8$, or
- $R_7$, $R_8$ and $R_9$, together with the N+-atom, can form heterocyclic radicals and the group of formula (VI) represents the radical of a multi-membered, saturated or partially saturated and optionally further substituted ring and the group of formula (VII) represents the radical of an unsaturated and optionally substituted ring and the aromatic rings $Z_1$ to $Z_4$ can be further substituted.

The dyestuffs of formula (I) can be obtained by coupling 1 mol of the tetrazo compound derived from a diamine or 1 mol of a mixture of tetrazo compounds derived from diamines of the formula (VIII)

-continued

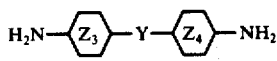

with two mols of like or different compounds of the formula

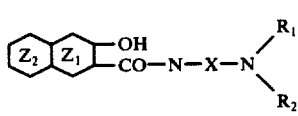 (IX).

The dyestuffs of formula (I) can also be prepared by reacting 1 mol of a compound of the formula or 1 mol of a mixture of compound of the formula

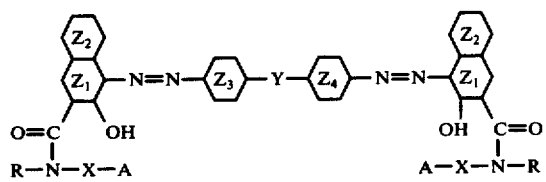 (X), wherein A represents the acid radical of an ester, with 2 mols of an amine or with 2 mols of a mixture of amines of the formula

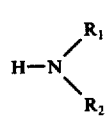 (XI).

The azo dyestuffs of formula (I) can also be prepared by reacting 1 mol of a compound or 1 mol of a mixture of compounds of the formula

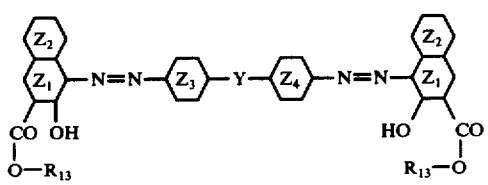 (XII), wherein $R_{13}$ represents a hydrogen atom or an optionally substituted alkyl radical, with 2 mols of compounds or with 2 mols of a mixture of a compound of formula

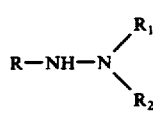 (XIII).

The azo dyestuffs of a formula (II) can be prepared by coupling 1 mol of a tetrazo compound or 1 mol of the mixture of tetrazo compounds from a diamine of the formula (VIII)

-continued

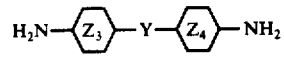

in any desired sequence with a compound of the formula

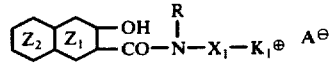 (XIV)

and with a compound of the formula (XV).

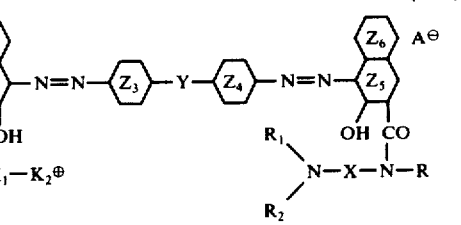

Azo dyestuffs of the formula (XVI),

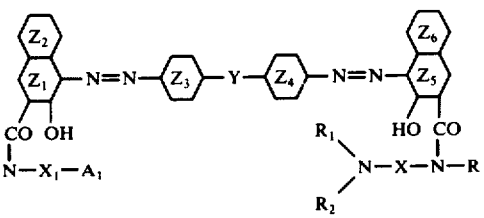

wherein $K_2^0$ represents a group of the formula (IV) or (V), can be prepared by reacting a compound a mixture of compounds of the formula (XVII),

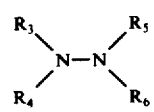

wherein $A_1$ represents a radiccal which can be transformed into an anion$^0$or an acid radical of an ester, with a compound of the formula (XVIII)

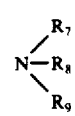

or (XIX).

The azo dyestuffs of formula (II) can also be obtained by reacting a compound of the formula (XX),

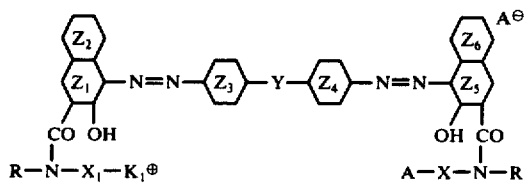

wherein A represents the acid radical of an ester, with an amine of the formula

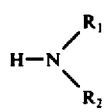
(XI).

The azo dyestuffs of the formula (II) can also be prepared by reacting a compound of the formula (XXI),

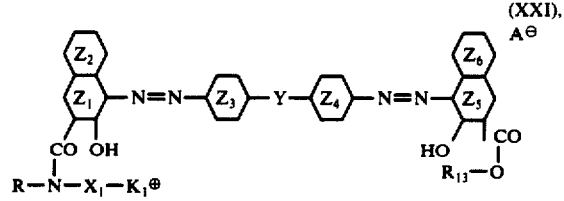

wherein $R_{13}$ represents a hydrogen atom or an optionally substituted alkyl radical, with a compound of the formula (XIII).

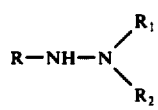

The azo dyestuffs of the formula (XXII),

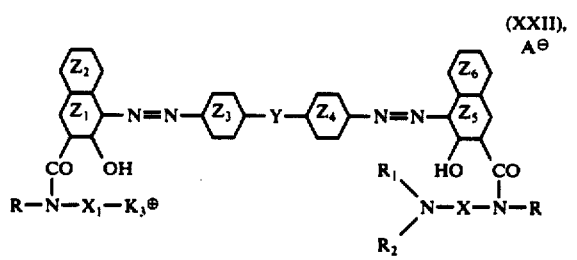

wherein $K_3^\oplus$ represents a group of the formula (V), (VI), and (VII) can be prepared by quaternizing a compound of the formula (XXIII)

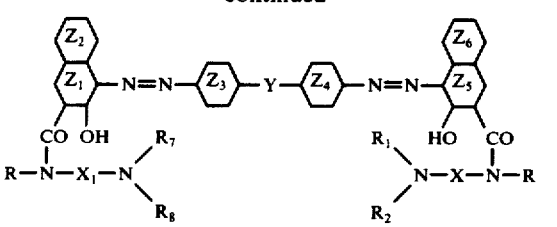
(XXIV)

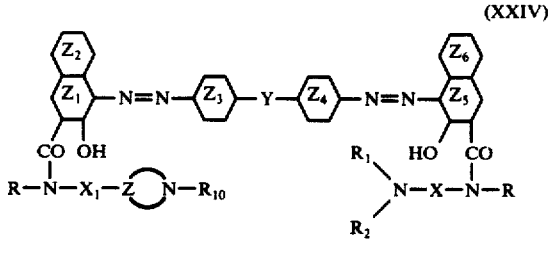
(XXV)

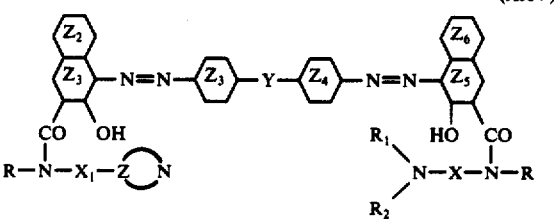

wherein the group

represents the radical of a saturated or partially saturated, optionally substituted ring and the group of the formula $$-Z\bigcirc N-$$

represents the radical of an unsaturated, optionally substituted ring, obtain a compound of formula (XXII), for example, with a compound of the formula $R_9$-A, $R_{11}$-A or $R_{12}$-A.

The azo dyestuffs of formula (III) can be obtained by coupling 1 mol of 2 tetrazo compound or 1 mol of a mixture of tetrazo compounds from a diamine of the formula (VIII)

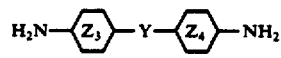

with 2 mols of like or different compounds of the formula (XIV)

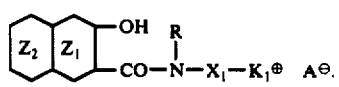

Azo dyestuffs of the formula (XXVI),

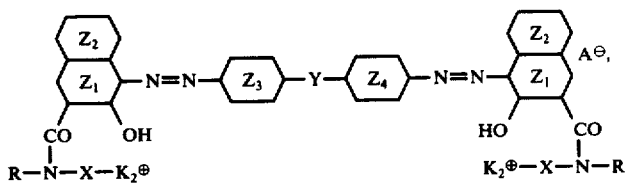

wherein $K_2^{\oplus}$ represents a group of the formula (IV) or (V), can be obtained by reacting a compound or a mixture of compounds of the formula

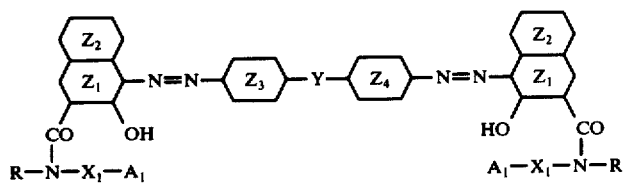
(XXVII), wherein $A_1$ represents a radical which can be transformed into an anion $A^{\ominus}$, with a compound of the formula (XVIII)

(XIX)

Azo dyestuffs of the formula

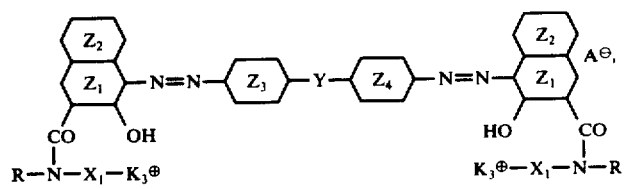
(XXVIII), wherein $X_3^{\ominus}$ represents a group of the formula (V), (VI) or (VII), can be obtained by quaternizing a compound of the formula (XXIX),

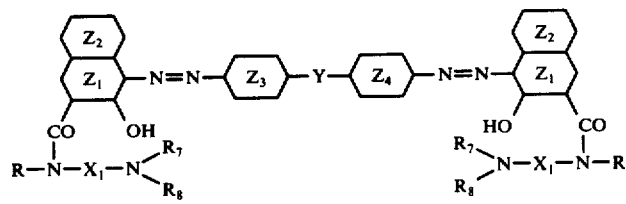
(XXX)

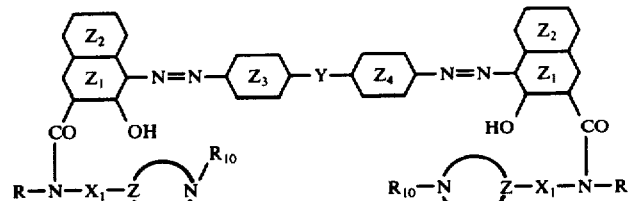

or (XXXI),

-continued

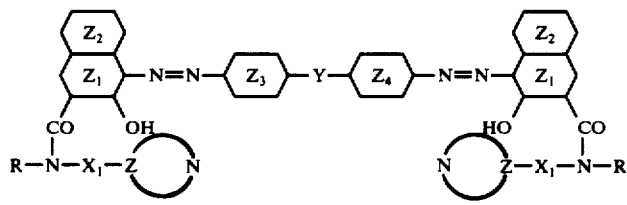

wherein the group

represents the radical of a saturated or partially saturated, optionally substituted ring and the group of the formula

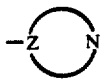

represents the radical of an unsaturated, optionally substituted ring, to obtain a compound of formula (XXVIII), for example, with a compound of the formula $R_9$-A, $R_{11}$-A or $R_{12}$-A.

Good azo dyestuffs are those in which X and $X_1$ stand for an optionally substituted, straight-chain or branched alkylene radical, and the aromatic rings $Z_1$ to $Z_6$ carry no other substituents.

Further representative dyes are those wherein Y is a straight-chain or branched alkylene radical, i.e. for example, dyestuffs of the formula

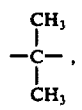

and the aromatic rings contain no further substituents.

The azo dyestuffs of formulae (I) and (II) can also be used in the form of their salts, for example, as hydrochlorides or acetates, for dyeing purposes; for example, for dyeing paper or textile material, which consists of acrylonitrile polymers or contains such polymers.

In the compounds of formulae (II) and (III), the anion $A^\ominus$ can be exchanged for other anions, for example, by means of an ion exchange or by reaction with salts or acids, possibly in several steps, for example, by way of the hydroxide or by way of the bicarbonate.

The new compounds are useful for dyeing, padding or printing fibres, threads or textiles which are produced therefrom and which consist of acrylonitrile polymers or copolymers or contain the same, or for dyeing or printing cotton and other cellulose fibres.

The new compounds also are useful for dyeing or (XXXII),

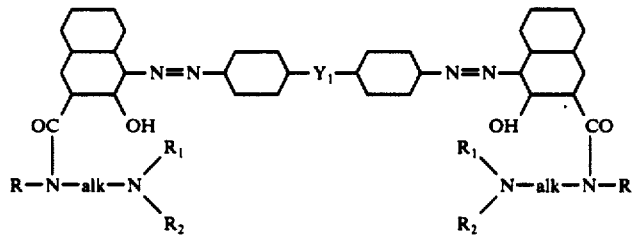

(XXXIII)

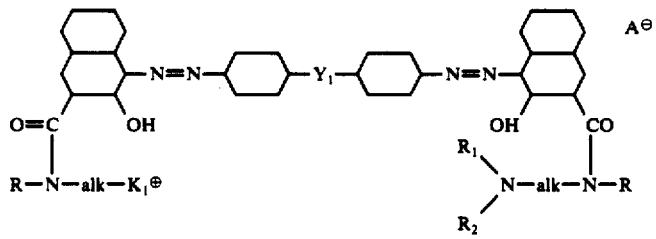

or (XXXIV),

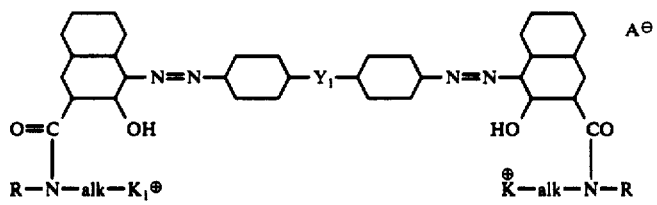

wherein
$Y_1$ represents a straight-chain or branched alkylene radical, for example, with 1, 2, 3 or 4 carbon atoms, for example —$CH_2$—, —$CH_2$—$CH_2$— or printing synthetic polyamides or synthetic polyesters, which are modified by acid groups. Such polyamides are, for example, known from Belgian Patent 706,104.

The corresponding polyesters are known from U.S. Pat. Nos. 3,018,272 or 3,379,723.

The dyeing is generally carried out in particularly advantageous manner in aqueous, neutral or acid medium at temperatures from 60°–100° C or at temperatures above 100° C under pressure. By this means, level dyeing effects are obtained, also without using retarding agents.

Mixed woven fabrics which contain a proportion of polyacrylonitrile fibres can also be very satisfactorily dyed. Those compounds which have a good solubility in organic solvents are also suitable for dyeing natural plastic compositions or dissolved or undissolved synthetic resin or natural resin compositions. It was also shown to be advantageous that mixtures of two or more of the new compounds or mixtures with other cationic dyestuffs can be used; that is to say, the compounds can be satisfactorily combined. They also serve for the dyeing of synthetic resin compositions or leather, or more especially for dyeing and printing paper. The dyeing effects obtained on paper are level, light-fast and wet-fast and have good fastness properties to bleaching, water, alcohol and light. When used for dyeing operations on paper, the dyestuffs have a high substantivity and thus a good synthesis power. The waste water after dyeing paper is colourless. They are suitable for being added dry and are pH-insensitive. They have a good resistance to heat and also good fastness to bleaching. Paper can be dyed by the usual methods, for example, at room temperature or slightly raised temperature, for example, according to the data given in French Pat. No. 1,551,512.

Level dyeing effects with good light fastness and good fastness properties to wet processing are obtained on acrylonitrile polymers or copolymers, but also on other substrates.

The new compounds can also be transformed into dyeing preparations. The processing, for example, into stable, liquid or solid dyeing preparations, can be carried out in a manner which is generally known, for example, by grinding or granulation, and then also dissolving in suitable solvents, possibly with addition of an auxiliary agent, for example, a stabiliser.

In every case, by halogen, there is to be understood bromine, fluorine or iodine, but more especially chlorine.

Hydrocarbon radicals in every case are advantageously optionally substituted alkyl, cycloalkyl and substituted aryl radicals, for example, cyclohexyl, alkylcyclohexyl, phenyl, naphthyl and tetrahydronaphthyl radicals.

Alkyl radicals, for example, straight-chain or branched alkyl radicals, usually contain 1 to 12, or 1 to 6 and preferably 1,2,3 or 4 carbon atoms. If these radicals are substituted, they contain more especially halogon atoms, hydroxyl groups, cyano groups or aryl radicals, for example phenyl radicals; in such cases, alkyl stands for an aralkyl radical, for example, a benzyl radical. Alkoxy radicals contain for example 1 to 6 and advantageously 1, 2 or 3 carbon atoms.

Alkylene radicals can be straight-chain or branched and can for example be substituted by halogen atoms, hydroxyl groups or cyano groups; they can contain 1 to 6 and preferably 1 to 3 carbon atoms.

Divalent radicals can for example be optionally substituted hydrocarbon radicals, such as optionally substituted alkylene or alkenylene radicals, phenylone radicals or cyclohexylene radicals, and generally the alkylene radicals can be interrupted by hetero atoms, such as oxygen, sulphur or nitrogen atoms.

Divalent radicals can also be the —SO$_2$—, —S—, —O— or

group.

$R_1$ and $R_2$ and also $R_3$ and $R_4$ can form a hetero-cyclic radical in conjunction with the adjacent N-atom, for example, a pyrrolidine, piperidine, morpholine, aziridine or piperazine ring.

The radical $R_5$, together with $R_5$ and/or the radical $R_4$, together with $R_6$, and the N-atoms adjacent the substituents, can form a saturated or unsaturated, preferably 5-membered or 6-membered heterocyclic compound, as for example a pyrazolidine, pyridazine or pyrazoline ring, e.g. trimethylene pyrazolidine or tetrimethylene pyrazolidine, etc.

The radicals $R_7$ and $R_8$ can, together with the adjacent N-atom, form a heterocyclic radical for example, a pyrrolidine, piperidine, morpholine, aziridine or piperazine ring.

The radicals $R_7$, $R_8$ and $B_9$ can, together with the adjacent N-atom, form a heterocyclic radical, for example, a group of the formula

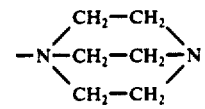

stand or/for a group.

The groups of the formulae

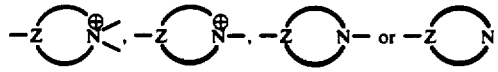

stand for example for the radicals of saturated or partially saturated, or unsaturated, optionally substituted multi-membered rings, advantageously 5-membered or 6-membered rings, on which optionally other cycloaliphatic, heterocyclic or aromatic rings can be condensed. These groups can accordingly stand, for example, for a pyridine, quinoline, piperidine, pyrrolidine, morpholine, aziridine, piperazine, isoquinoline, tetrahydroquinoline, pyrazole, triazole, pyridazine, imidazole, pyrimidine, thiazole, benzothiazole, thiadiazole, indazole, imidazole, pyrrole, indole, oxazole, isoxazole or tetrazole ring, etc.

As radicals A or $A_1$, there are advantageously to be considered the radicals of the hydrohalide acids; A or $A_1$ preferably stands for chlorine or bromine. Other acid radicals A or $A_1$ are for example those of sulphuric acid, a sulphonic acid or of hydrogen sulphide.

All radicals of aromatic character, for example, aromatic-carbocyclic radicals, as for example the rings $Z_1$ to $Z_6$, or aromatic-heterocyclic radicals, such as aryl radicals, for example, phenyl, naphthyl or tetrahydronaphthyl, or pyridyl, quinolyl or tetrahydroquinolyl radicals, can carry substituents, more especially water-insolubilising substituents, for example, halogen atoms, nitro, amino, cyano, thiocyano, hydroxyl, alkyl, alkoxy, trifluoroalkyl, trichlonoalkyl, phenyl phenoxy, alkylamino, dialkylamino, acyl, acyloxy, acylamino groups, for example urethane, alkylsulphonyl, arylsulphonyl, sulphonic acid amide, alkylsulphonic acid amide, dialkylsulphonic acid amide, and arylsulphonic acid amide groups, arylazo, for example phenylazo, diphenylazo, naphthylazo, etc.

However, they can also carry the —COOH group.

As anion A⁻, there are to be understood both organic and inorganic ions, such as halogen ions, such as chloride, bromide or iodide ions, sulphate, disulphate, methylsulfate, aminosulphonate, perchlorate, carbonate, bicarbonate, phosphate, phosphomolydate, phosphotungstate, phosphotungstomolybdoate, benzenesulfonate, naphthylenesulfonate, 4-chlorobenzenesulfonate, oxalate, maleinate, acetate, propionate, lactate, succinate, chloroacetate tartrate, methanesulfonate or benzoate ions, or complex anions, such as the anion of zinc chloride double salts. The coupling can be carried out by methods as known per se, for example, in acid, neutral or alkali medium, preferably in acid medium at pH from 2 to 7. Oxidative coupling can also be effective.

The reaction of a compound of formula (XII) or (XXI) with a compound of formula (XIII) can also be effected by methods as known per se, for example in an inert solvent, possibly with addition of a compound having an alkali reaction, for example, alkali metal hydroxides or carbonates, and if necessary at elevated temperatures and under pressure.

The reaction of a compound of the formula (X), (XVII) or (XXVII) with a compound of the formula (XI), (XVIII) is advantageously effected in an organic solvent and at temperatures from −50° C to +250° C, preferably at −10° C to +120° C.

The quaternisation can also be carried out by usual methods, for example, in an inert solvent or possibly in aqueous suspension, or without solvent in an excess of the quaternising agent, if necessary at elevated temperturwe and in optionally buffered medium. Quaternisng agents are for example alkyl halides, such as methyl or ethyl chloride, bromide or iodide, alkylsulphates, such as dimethylsulphate, benzyl chloride, acrylic acid amide/hydrochloride, for example, $CH_2=CH—C—C—NH_2/HCl$, chloroacetic acid amide, propylene oxide, epichlorhydrin, etc.

Quaternising agents are for example $R_9$-A, $R_{11}$-A or $R_{12}$-A.

Japanese Specification 8085/62 mentions the dyestuff of the formula

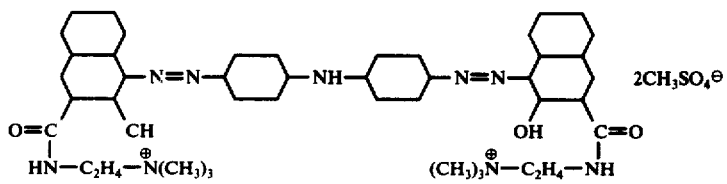

for dyeing polyacrylonitrile. The dyeing of paper is not mentioned. It is surprising that the compounds of formula (I), used for dyeing paper, more especially unsized paper, are quantitatively absorbed and have good fastness to water and alcohol.

In the following examples, the parts represent parts by weight and the temperatures are given in degrees centigrade

EXAMPLE 1

12.2 parts of dianisidine are tetrazotised in hydrochloric acid solution at 0°–5° with 6.9 parts of sodium nitrito and coupled by addition in portions of sodium bicarbonate at a pH of 4–7 on to 27.2 parts of 2-hydroxy-3-naphthoic acid 3-N,N-dimethylaminopropyl amido. A blue dyestuff with a reddish tinge having the formula

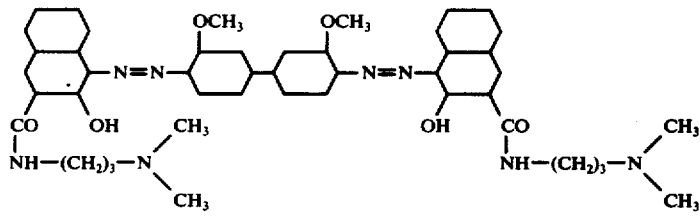

is obtained.

EXAMPLE 2

12.1 parts of 4,4′-diaminodiphenyl urea are tetrazotised as in Example 1 and coupled at a pH of 4–7 on to 27.2 parts of the coupling component mentioned in Example 1. There is obtained a violet dyestuff of the formula

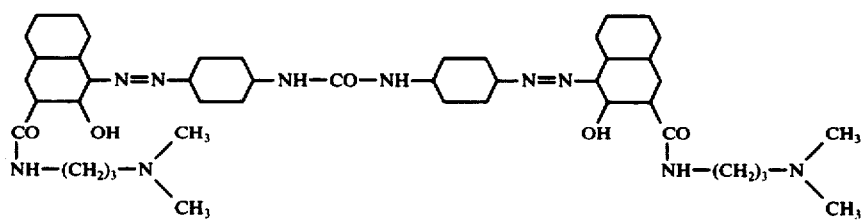

EXAMPLE 3

9.9 parts of 4,4'-diaminodiphenylmethane are tetrazotised as in Example 1 and coupled at a pH of 4-7 on to 27.2 parts of the coupling component mentioned in Example 1. There is obtained a red dyestuff of the formula

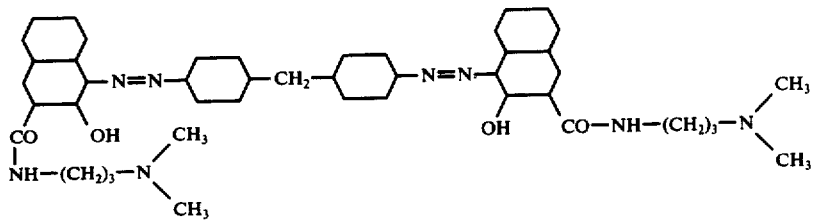

EXAMPLE 4

10.5 parts of 4,4'-diaminostilbene are tetrazotised as in Example 1 and coupled at a pH of 4-7 on to 27.2 parts of the compling component mentioned in Example 1. There is obtained a blue dyestuff of a reddish tinge having the formula

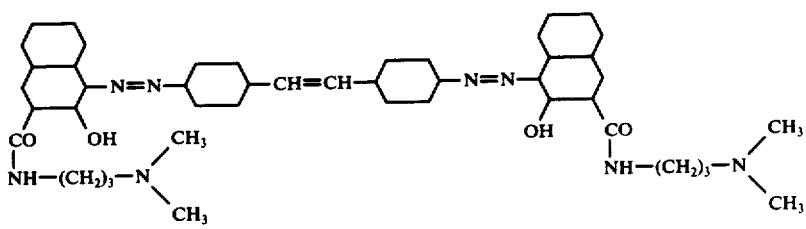

EXAMPLE 5

35 parts of the dyestuff of the formula

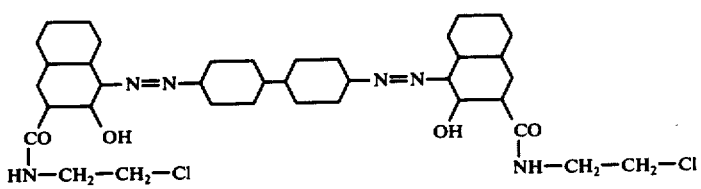

are heated in 100 parts of 20%, aqueous dimethylamine solution and 5.3 parts of soda for 4 hours in a pressure vessel at 40°-60°. A violet dyestuff is obtained.

EXAMPLE 6

31 parts of the dyestuff of the formula are heated in 150 parts of dimethylhydrazine for 2 hours at 80°. By precipitation into water, a red dyestuff is obtained.

EXAMPLE 7

$K_{10}$ = coupling component of the formula

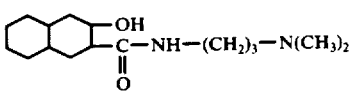

$K_{11}$ = coupling component of the formula

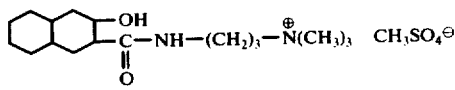

12.2 parts of dianisidine are tetrazotised in hydrochloride acid solution at 0°-5° with 6.9 parts of sodium nitrite and, by addition in portions of sodium bicarbonate at a pH of 4-7, coupled on to 13.6 parts of $K_{10}$ and 19.9 parts of $K_{11}$. A blue dyestuff with a reddish tinge having the formula

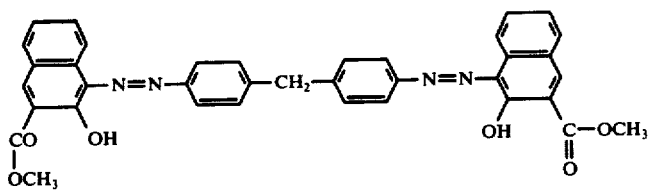

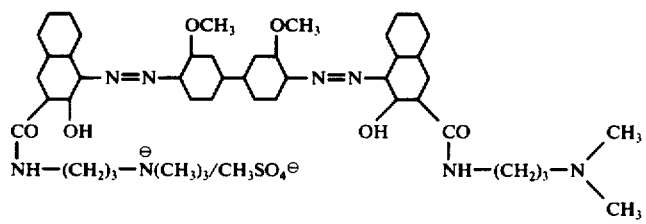

is obtained.

EXAMPLE 8

12.1 parts of 4,4'-diaminodiphenyl urea are tetrazotised in a manner similar to Example 7 and, at a pH of 4-7, are coupled on to 13.6 parts of the coupling component of formula $K_{10}$ and 19.9 parts of the coupling component of formula $K_{11}$. A violet dyestuff having the formula

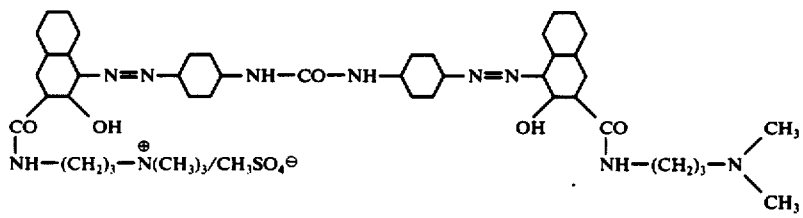

is obtained.

EXAMPLE 9

9.9 parts of 4,4'-diaminodiphenyl methane are tetrazotised in a manner similar to Example 7 and, at a pH of 4-7, coupled on to 13.6 parts of the coupling component of formula $K_{10}$ and 19.9 parts of the coupling component of formula $K_{11}$. A red dyestuff having the formula

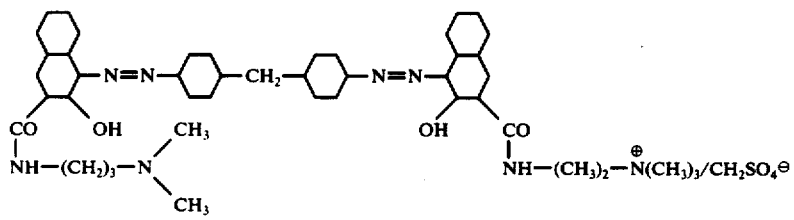

is obtained.

EXAMPLE 10

10.5 parts of 4,4'-diaminostilbene are tetrazotised similarly to Example 7 and coupled at a pH of 4-7 on to 13.6 parts of the coupling component of formula $K_{10}$ and 19.9 parts of the coupling component of formula $K_{11}$. A blue dyestuff with a reddish tinge having the formula

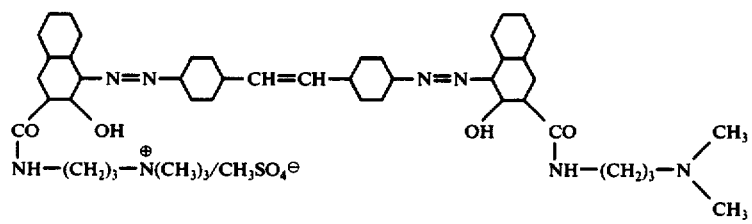

is obtained.

EXAMPLE 11

35 parts of the dyestuff of the formula

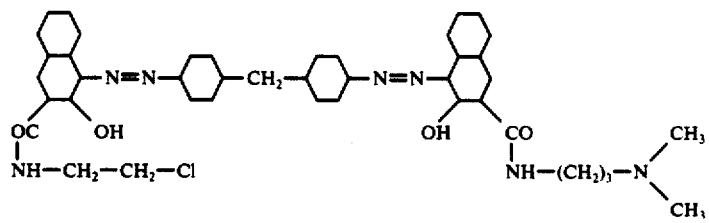

are heated with 18 parts of dimethylhydrazine in 800 parts of dimethylformamide for 3 hours at 60°-80°. Upon addition of toluene to the dye solution, the red dye precipitates. It is filtered off and dried.

EXAMPLE 12

43 parts of the dyestuff of the formula

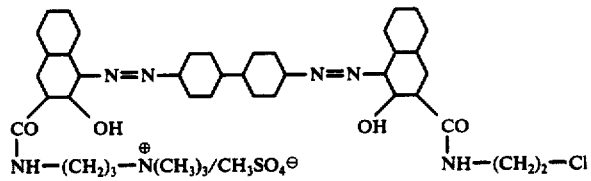

are heated in 100 parts of 30% aqueous dimethylamine solution for 4 hours in a pressure vessel at 30°-50°. A violet dyestuff is obtained.

EXAMPLE 13

41 parts of the dyestuff of the formula

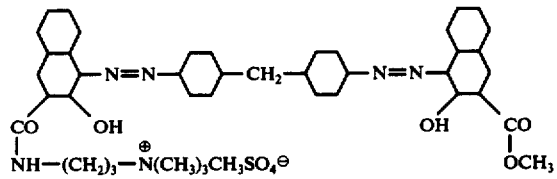

are heated in 150 parts of dimethylhydrazine for 1 hour at 60°. The solution is poured into water to precipitate the red dye.

EXAMPLE 14

37 parts of the dyestuff of the formula

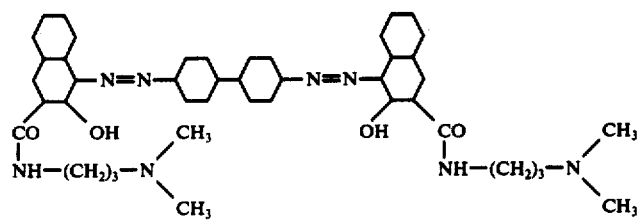

are heated in 400 parts of dimethylformamide with 6.3 parts of dimethylsulphate for 3 hours at 60°-70°. A violet dyestuff is obtained.

EXAMPLE 15

12.2 parts of dianisidine are tetrazotised in hydrochloric acid solution at 0°-5° with 6.9 parts of sodium nitrite and, by addition in portions of 16 parts of sodium bicarbonate, coupled at a pH of 4-7 to 39.8 parts of the coupling component of formula

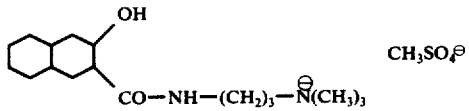

A blue dyestuff with a reddish tinge having the formula is obtained.

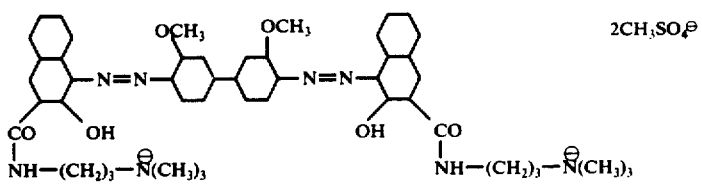

The coupling component is prepared by known methods. 2-hydroxynaphthalene-3-carboxylic acid is esterified with methanol, reacted with 3-N,N-dimethylaminopropylamine and quaternised with dimethylsulphate.

EXAMPLE 16

12.1 parts of 4,4'-diaminodiphenyl urea are tetrazotised in hydrochloric acid solution at 0-5° with 6.9 parts of sodium nitrite and, by addition in portions of 16 parts of sodium-bicarbonate, coupled at a pH of 4-7 on to 39.8 parts of the coupling component mentioned in Example 15. A violet dyestuff having the formula is obtained.

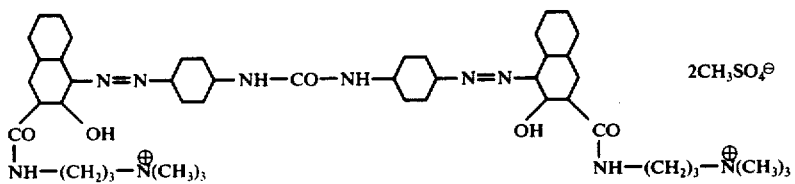

EXAMPLE 17

9.9 parts of 4,4'-diaminodiphenylmethane are tetrazotised in hydrochloric acid solution at 0°–5° with 6.9 parts of sodium nitrite and, by addition in portions of 16 parts of sodium bicarbonate, coupled at a pH of 4–7 on to 39.8 parts of the coupling component mentioned in Example 15. A red dyestuff having the formula

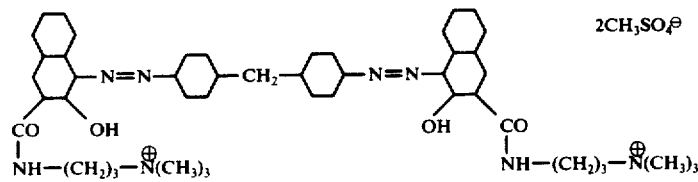

is obtained.

EXAMPLE 18

10.5 parts of 4,4'-diaminostilbene are tetrazotised as in Example 15 and coupled at a pH of 4–7 on to 39.8 parts of the coupling component mentioned in Example 15. A blue dyestuff with a reddish tinge having the formula

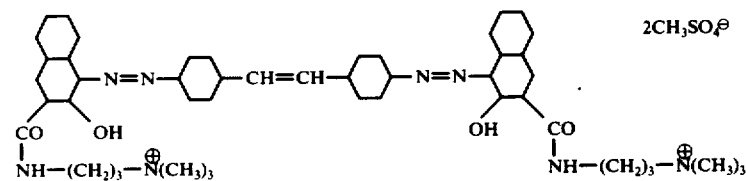

is obtained.

EXAMPLE 19

9.9 parts of 4,4'-diaminodiphenylmethane are tetrazotised as in Example 17 and coupled on to 25 parts of 2-hydroxynaphthalene-3-carboxylic acid (β-chloroethylamide). The dyestuff is filtered off and dried.

It is heated with 18 parts of dimethylhydrazine, dissolved in 1000 parts of dimethylformamide, and heated for 3 hours at 60°–80°. The water-soluble, red dyestuff is precipitated by adding toluene, and is filtered off and dried. The coupling component is obtained by known methods by reacting 2-hydroxynaphthalene-3-carboxylic acid methyl ester with ethanolamine and subsequent chlorination in toluene with thionylchloride.

EXAMPLE 20

12.2 parts of dianisidine are tetrazotised as in Example 15 and coupled at a pH value of 4–7 on to 27.2 parts of 2-hydroxynaphthalene-3-carboxylic acid-(dimethylaminopropylamide). The dried reddish-blue dyestuff is dissolved in 800 parts of dimethylformamide, and heated with 16 parts of dimethylsulphate for 3 hours at 70°. The same dyestuff as in Example 15 is formed.

DYEING PROCEDURE A 70 parts of chemically bleached sulphite cellulose are mixed with 30 parts of chemically bleached birch cellulose and 0.2 part of the dyestuff obtained according to Example 1, 7 or 15, dissolved in water or a mixture of water and acetic acid. After 10 minutes, paper sheets are produced from this pump. The absorbent paper as thus obtained has a red-tinged blue shade; the dyestuff is quantitatively absorbed and the dyeing has a good fastness to water and alcohol.

DYEING PROCEDURE B 100 parts of chemically bleached sulphite cellulose are ground in a hollander. During the grinding, 2 parts of resin glue are added, and shortly afterwards 0.5 part of an aqueous or aqueous-acetic acid solution of the dyestuff according to Example 1, 7 or 15. After 10 minutes, 3 parts of aluminum sulphate are added and, after another 10 minutes, paper sheets are prepared from this pulp. The paper has a reddish-tinged blue shade of medium intensity and is dyed with the same good fastness properties as in Example A. If paper is dyed with the dyestuffs of Examples 2–112, similarly good dyeing effects are obtained.

DYEING PROCEDURE C

A dye bath is prepared as follows: 1 part of the dyestuff obtained according to Example 1, 7 or 15 and 20 parts of calcined sodium sulphate are dissolved in 3000 parts of demineralised water and the bath is adjusted with acetic acid to a pH value of 5.5. At room temperature, 100 parts of bleached cotton yarn are introduced and the bath is thereafter brought within 20 minutes to the boiling point. Another 10 parts of calcined sodium sulphate are added. The dyeing lasts 20 minutes at the boiling point. Before cooling to 50°, another 10 parts of calcined sodium sulphate are added. The yarn is thereafter made ready by known methods. Care is to be taken that the pH value of the dye bath should not be below 5 and not more than 6.5 during the dyeing. A reddish-tinged blue dyeing is obtained with good light fastness and good fastness to wet processing.

DYEING PROCEDURE D 20 parts of the dyestuff of Example 1, 7 or 15 are mixed with 80 parts of dextrin in a ball mill for 48 hours. 1 part of the preparation as thus obtained is formed into a paste with 1 part of 40% acetic acid, 400 parts of demineralised water are poured on to the paste and this is boiled for a short time. It is diluted with 7000 parts of demineralised water, 2 parts of glacial acetic acid are added and introduced at 60° with 100 parts of polyacrylonitrile woven fabric into the bath. The material can be pretreated beforehand for 10 to 15 minutes at 60° in a bath which consists of 8000 parts of water and 2 parts of glacial acetic acid.

The bath is heated within 30 minutes to 98°-100°, the material is boiled for 1½ hours and rinsed. A reddish-tinged blue dyeing is obtained with good light fastness and good fastness to wet processing. Other dyes which can be obtained following the processes of the foregoing Examples are set forth in Table I.

The symbols $W_1$, $W_2$, Y, X', R and $K_{10}^+$ in the formula

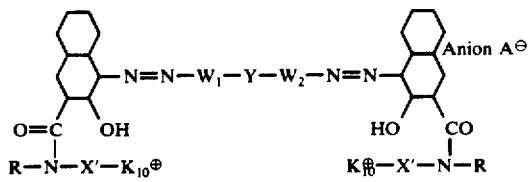

have the meanings indicated in Table 1.

As anion $A^-$, there are to be considered those given in the specification.

Table (I)

| Example No. | $K_{10}^\oplus$ | R | X' | Y | $W_1$ | $W_2$ | Shade of the dyeing on paper |
|---|---|---|---|---|---|---|---|
| 21 | $-\overset{\oplus}{N}(CH_3)_3$ | H | $-C_2H_4-$ | $-CH_2-$ | ⬡ | ⬡ | red |
| 22 | " | H | " | direct bond | " | " | violet |
| 23 | " | H | " | $-CH=CH-$ | " | " | " |
| 24 | " | H | " | $-NH-\overset{O}{\underset{\|}{C}}-NH-$ | " | " | " |
| 25 | " | H | " | $-S-$ | " | " | red |
| 26 | " | H | " | $-O-$ | " | " | " |
| 27 | $\oplus$ " | $-CH_3$ | " | $-CH_2-$ | " | " | red |
| 28 | $-\overset{\oplus}{N}(C_2H_5)_3$ | H | " | " | (2,4,6-triMe-phenyl) | (2,4,6-triMe-phenyl) | " |
| 29 | $\underset{\underset{\oplus}{\|}}{-N}\overset{CH_3}{\underset{-(C_2H_5)_2}{}}$ | H | $-C_2H_4-$ | $-CH_2-$ | ⬡ | ⬡ | red |
| 30 | $-\overset{\oplus}{\underset{CH_3}{\underset{\|}{N}}}-CH_2-CH_2-OH$ ($CH_3$) | H | " | " | " | " | " |
| 31 | pyridinium | H | " | " | " | " | " |
| 32 | $-\overset{\oplus}{\underset{NH_2}{\underset{\|}{N(CH_3)_2}}}$ | H | " | " | " | " | " |
| 33 | $-\overset{\oplus}{N}\langle H\rangle CH_3$ | H | " | " | " | " | " |
| 34 | $-\overset{\oplus}{N}\langle H\rangle CH_3$ | H | " | " | " | " | " |
| 35 | $-\overset{\oplus}{N}(CH_3)_3$ | $-CH_3$ | $-C_3H_6-$ | $-CH_2-$ | ⬡ | ⬡ | red |
| 36 | " | H | " | " | (2,6-diMe-phenyl) | (2,6-diMe-phenyl) | " |
| 37 | " | H | " | " | (2,6-diMe-phenyl) | (2,6-diMe-phenyl) | " |

Table (I)-continued

| Example No. | $K_{10}^{\oplus}$ | R | X' | Y | $W_1$ | $W_2$ | Shade of the dyeing on paper |
|---|---|---|---|---|---|---|---|
| 38 | " | H | " | " | OCH₃-phenyl | OCH₃-phenyl | " |
| 39 | " | H | " | " | Cl-phenyl | Cl-phenyl | " |
| 40 | " | H | " | —S— | phenyl | phenyl | " |
| 41 | $-\overset{\oplus}{N}(CH_3)_3$ | H | —C₃H₆— | —O— | phenyl | phenyl | red |
| 42 | " | H | —C₂H₄— | direct bond | OCH₃-phenyl | OCH₃-phenyl | " |

Other dyes which can be obtained according to the processes of the foregoing Examples are set forth in Table II.

The symbols $W_1$, $W_2$, Y, X', R, $K_{11}^+$ and $K_{12}^+$ in the formula

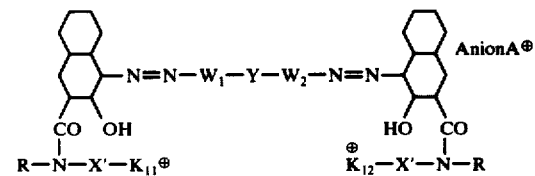

have the meanings indicated in Table (II).

As anion A⁻, there are to be considered those given in the specification.

Table (II)

| Example No. | $K_{11}^{\oplus}$ | $K_{12}^{\oplus}$ | R | X' | Y | $W_1$ | $W_2$ | Shade of the dyeing on paper |
|---|---|---|---|---|---|---|---|---|
| 43 | $-\overset{\oplus}{N}(CH_3)_3$ | $-\overset{\oplus}{N}(C_2H_5)_3$ | H | —C₂H₄— | —CH₂— | phenyl | phenyl | red |
| 44 | " | $-\overset{\oplus}{N}(C_2H_4-OH)$ with CH₃, CH₃ | H | " | " | " | " | " |
| 45 | " | " | H | direct bond | " | " | " | violet |
| 46 | " | " | H | " | —CH=CH— | " | " | " |
| 47 | " | " | H | " | —NH—C(O)—NH— | " | " | " |
| 48 | " | " | H | " | —S— | " | " | red |
| 49 | $-\overset{\oplus}{N}(CH_3)_3$ | $-\overset{\oplus}{N}(C_2H_4OH)$ with CH₃, CH₃ | H | —C₂H₄— | —O— | phenyl | phenyl | red |
| 50 | " | " | —CH₃ | " | —CH₂— | " | " | " |
| 51 | " | $-\overset{\oplus}{N}(C_2H_5)_2$ with CH₃ | H | " | " | " | " | " |
| 52 | " | pyridinium | H | " | " | " | " | " |
| 53 | " | $-\overset{\oplus}{N}(CH_3)_2$ with NH₂ | H | " | " | " | " | " |
| 54 | $-\overset{\oplus}{N}(CH_3)_3$ | N-methyl azepanium (H, CH₃) | H | —C₂H₄— | —CH₂— | phenyl | phenyl | red |
| 55 | " | N-methyl pyrrolidinium (H, CH₃) | H | " | " | " | " | " |

Table (II)-continued

| Example No. | $K^{\oplus}_{11}$ | $K^{\oplus}_{12}$ | R | X' | Y | $W_1$ | $W_2$ | Shade of the dyeing on paper |
|---|---|---|---|---|---|---|---|---|
| 56 | " | $-\overset{\oplus}{\underset{CH_3}{\underset{|}{N}}}-(C_2H_4OH)$ with $CH_3$ | H | $-C_3H_6-$ | direct bond | " | " | violet |
| 57 | " | " | H | " | " | (cyclohexyl with OCH$_3$) | (cyclohexyl with OCH$_3$) | blue |
| 58 | " | " | " | $-C_2H_4-$ | " | " | " | " |
| 59 | " | " | $-CH_3$ | $-C_3H_6-$ | " | " | " | " |
| 60 | " | " | H | $-C_2H_4-$ | $-CH_2-$ | (H$_3$C-cyclohexyl-CH$_3$) | (CH$_3$-cyclohexyl-CH$_3$) | red |
| 61 | (pyridinium) | $-\overset{\oplus}{\underset{CH_3}{\underset{|}{N}}}-(C_2H_4OH)$ with $CH_3$ | H | $-C_2H_4-$ | $-CH_2-$ | (cyclohexyl) | (cyclohexyl) | red |
| 62 | " | $-\overset{\oplus}{\underset{NH_2}{\underset{|}{N}}}(CH_3)_2$ | H | " | " | " | " | " |
| 63 | $-\overset{\oplus}{\underset{CH_3}{N}}$ (ring with H) | $-\overset{\oplus}{\underset{CH_3}{N}}$ (ring with H) | H | " | " | " | " | " |

Other dyes which can be obtained following the processes of the foregoing Examples are set forth in Table III.

The symbols $W_1$, $W_2$, $Y_1$, X', R, $K_{13}^+$ and $F_1$ in the formula

$A^{\ominus}$ have the meanings indicated in Table (III).

As anion $A^-$, there are to be considered those mentioned in the specification.

Table (III)

| Example No. | $K^{\oplus}_{13}$ | $F_1$ | R | X' | Y | $W_1$ | $W_2$ | Shade of the dyeing on paper |
|---|---|---|---|---|---|---|---|---|
| 64 | $-\overset{\oplus}{N}(CH_3)_3$ | $-N(CH_3)_2$ | H | $-C_2H_4-$ | $-CH_2-$ | (cyclohexyl) | (cyclohexyl) | red |
| 65 | " | " | H | " | $-CH=CH-$ | " | " | violet |
| 66 | " | " | H | " | direct bond | " | " | " |
| 67 | " | " | H | " | " | (cyclohexyl with OCH$_3$) | (cyclohexyl with OCH$_3$) | blue |
| 68 | " | " | $-CH_3$ | " | " | " | " | " |
| 69 | " | " | H | " | $-NH-\underset{O}{\overset{\|}{C}}-NH-$ | " | " | violet |
| 70 | " | " | H | " | $-S-$ | " | " | red |
| 71 | " | " | H | " | $-O-$ | " | " | " |
| 72 | $-\overset{\oplus}{N}(CH_3)_3$ | $-N(CH_3)_2$ | H | $-C_3H_6-$ | $-O-$ | (cyclohexyl) | (cyclohexyl) | red |
| 73 | " | " | H | " | $-S-$ | " | " | " |
| 74 | " | $-NH-CH_3$ | H | $-C_2H_4-$ | $-CH_2-$ | " | " | " |
| 75 | " | $-NH_2$ | H | " | " | " | " | " |

Table (III)-continued

| Example No. | K⊕ | F₁ | R | X' | Y | W₁ | W₂ | Shade of the dyeing on paper |
|---|---|---|---|---|---|---|---|---|
| 76 | " | -N(CH₃)(C₂H₄OH) | H | " | " | " | " | " |
| 77 | " | -N(CH₂-CH₂)(CH₂-CH₂) (pyrrolidine) | H | " | " | " | " | " |
| 78 | " | -N(CH₃)₂ | H | " | " | " | " | " |
| 79 | pyridinium with CH₃, ⊕N-C₂H₄OH, CH₃ | -N(CH₃)₂ | H | -C₂H₄- | -CH₂- | 2,4,6-(CH₃)₃-phenyl | 2,4,6-(CH₃)₃-phenyl | red |
| 80 | CH₃-⊕N(CH₃)-NH₂ | " | H | -C₂H₄- | -CH₂- | " | " | " |
| 81 | -⊕N(CH₃)(piperidinium H) | " | H | " | " | " | " | " |
| 82 | -⊕N(CH₃)(pyrrolidinium H) | " | H | " | " | " | " | " |

Other dyes which can be obtained following the processes of the foregoing Examples are set forth in Table IV.

The symbols W₁, W₂, Y, X', R and F₂ in the formula

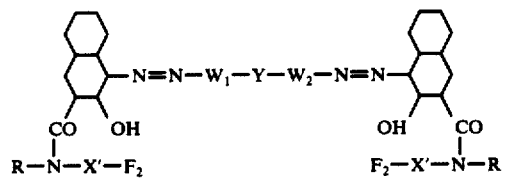

have the meanings indicated in Table (IV)

Table (IV)

| Example No. | F₂ | R | X' | Y | W₁ | W₂ | Shade of the dyeing on paper |
|---|---|---|---|---|---|---|---|
| 83 | -N(CH₃)₂ | H | -C₂H₄- | -CH₂- | phenyl | phenyl | red |
| 84 | " | H | " | direct bond | " | " | violet |
| 85 | " | H | " | -CH=CH- | " | " | " |
| 86 | " | H | " | -NH-C(=O)-NH- | " | " | " |
| 87 | " | H | " | -S- | " | " | red |
| 88 | " | H | " | -O- | " | " | " |
| 89 | " | -CH₃ | " | -CH₂- | " | " | " |
| 90 | " | H | " | " | 2,4,6-(CH₃)₃-phenyl | 2,4,6-(CH₃)₃-phenyl | " |
| 91 | " | H | " | direct bond | 2-OCH₃-phenyl | 2-OCH₃-phenyl | blue |
| 92 | " | -CH₃ | " | " | " | " | " |

Table (IV)-continued

| Example No. | F$_2$ | R | X' | Y | W$_1$ | W$_2$ | Shade of the dyeing on paper |
|---|---|---|---|---|---|---|---|
| 93 | −N(C$_2$H$_5$)$_2$ | H | " | −CH$_2$− | ⌬ | ⌬ | " |
| 94 | −NH−CH$_3$ | H | " | " | " | " | " |
| 95 | −NH$_2$ | H | " | " | " | " | " |
| 96 | −N(CH$_3$)(C$_2$H$_4$−OH) | H | " | " | " | " | " |
| 97 | −N(CH$_2$−CH$_2$)$_2$ (morpholino/pyrrolidine) | H | " | " | " | " | " |
| 98 | −N(CH$_3$)$_2$ | H | −C$_3$H$_6$− | direct bond | " | " | violet |

Additional dyes that can be prepared following the processes of the foregoing Examples are set forth in Table V.

The symbols W$_1$, W$_2$, Y, X', R, F$_3$ and F$_4$ in the formula have the meanings indicated in the Table.

The radicals indicated by the symbols K$_{10}^+$ to K$_{13}^+$ can be replaced by any radical K$_{10}^+$ to K$_{13}^+$ indicated in another example. The same applies for the examples with the symbols F$_1$ to F$_4$.

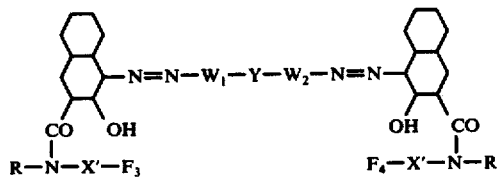

Table (V)

| Ex. No. | F$_3$ | F$_4$ | R | X' | Y | W$_1$ | W$_2$ | Shade of the dyeing on paper |
|---|---|---|---|---|---|---|---|---|
| 99 | −N(CH$_3$)$_2$ | −NH−CH$_3$ | H | −C$_2$H$_4$− | −CH$_2$− | ⌬ | ⌬ | red |
| 100 | " | " | −CH$_3$ | " | " | " | " | " |
| 101 | " | −N(C$_2$H$_5$)$_2$ | H | " | " | " | " | " |
| 102 | " | −N(CH$_3$)(C$_2$H$_4$−OH) | H | " | " | " | " | " |
| 103 | " | " | H | " | −CH−CH− | " | " | violet |
| 104 | " | " | H | " | direct bond | " | " | " |
| 105 | " | " | H | " | " | ⌬-OCH$_3$ | ⌬-OCH$_3$ | blue |
| 106 | " | " | −CH$_3$ | " | " | " | " | " |
| 107 | " | " | H | " | −NH−C(=O)−NH− | ⌬ | ⌬ | violet |
| 108 | " | " | H | " | −S− | " | " | red |
| 109 | " | " | H | " | −O− | " | " | " |
| 110 | −N(CH$_2$−CH$_2$)$_2$ | " | H | " | −CH$_2$− | " | " | " |
| 111 | " | −N(C$_2$H$_5$)$_2$ | " | H | " | " | ⌬(CH$_3$)$_2$ | ⌬(CH$_3$)$_2$ | " |
| 112 | " | −NH$_2$ | H | " | " | ⌬ | ⌬ | " |

Formulae of representative dyes of the foregoing Examples are as follows:
EXAMPLE 1
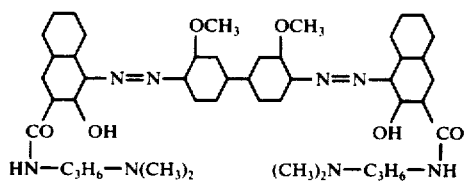
EXAMPLE 3
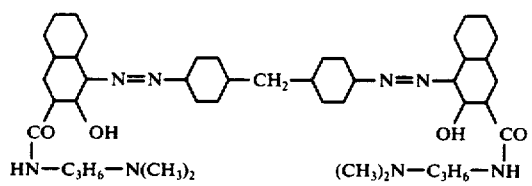
EXAMPLE 7
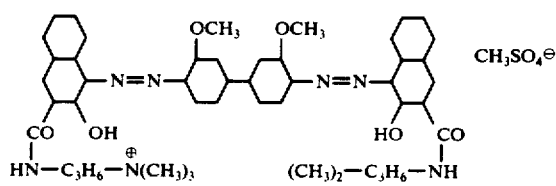
EXAMPLE 9
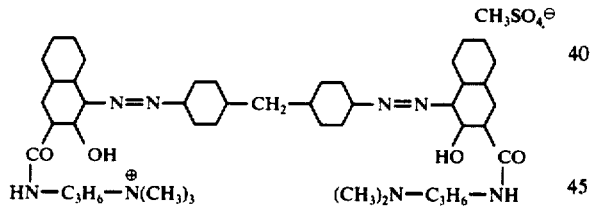
EXAMPLE 15
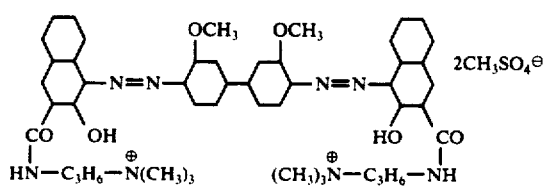
EXAMPLE 16
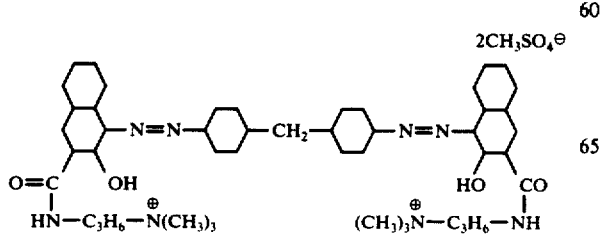
EXAMPLE 21
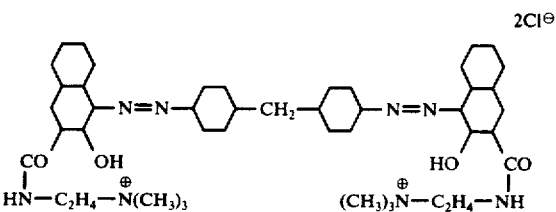
EXAMPLE 22
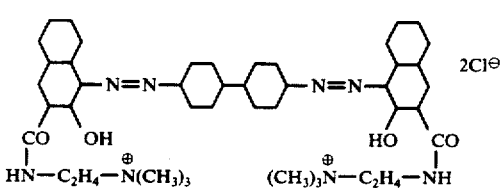
EXAMPLE 42
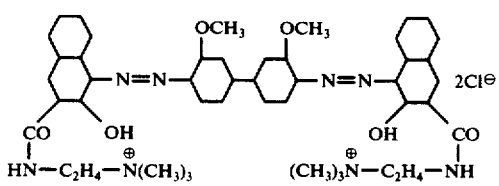
EXAMPLE 54
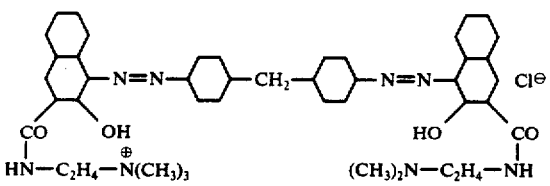
EXAMPLE 66
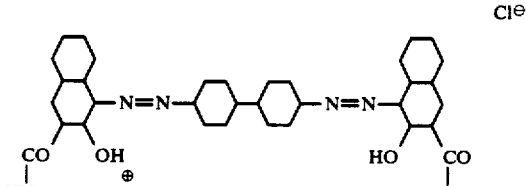
EXAMPLE 67
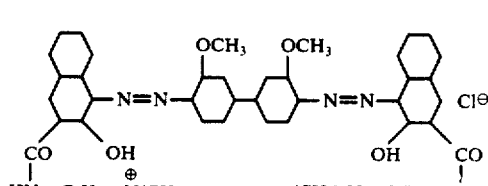

EXAMPLE 83

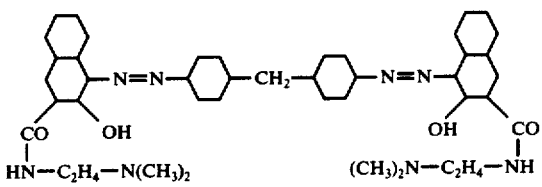

EXAMPLE 91

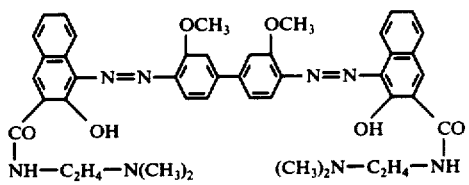

EXAMPLE 98

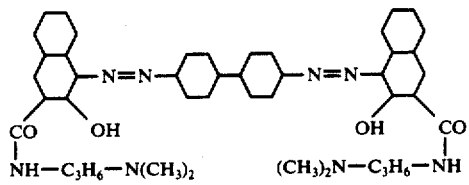

Having thus disclosed the invention, what we claim is:

1. In a process for the production of colored paper comprising (A) incorporating a dye composition into paper stock and forming paper from said paper stock or (B) applying a dye composition to paper sheet, the improvement formula

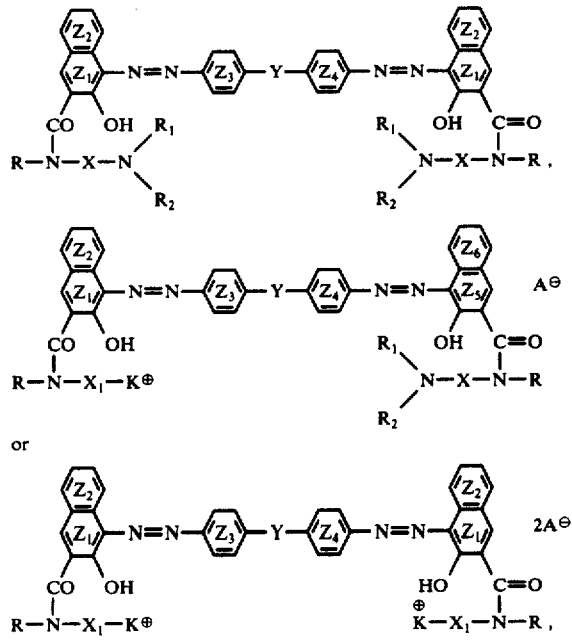

wherein each

R, $R_1$ and $R_2$ is independently hydrogen, hydrocarbyl or substituted hydrocarbyl or $R_1$ and $R_2$ taken together and with the nitrogen atom to which they are joined form a saturated or partially saturated heterocyclic group, each $K^{30}$ is independently an ammonium, substituted ammonium, hydrazinium, substituted hydrazinium, cycloimmonium or substituted cycloimmonium group, each X is independently a direct bond or a divalent radical, each $X_1$ is independently a divalent radical, Y is a direct bond, alkylene, substituted alkylene, —S—, —O—, —NH—CO—NH— or —CH=CH—, and each $A^-$ is independently an anion, wherein each of Rings $Z_1$, $Z_2$, $Z_3$, $Z_4$, $Z_5$ and $Z_6$ is independently further unsubstituted or further substituted.

2. A process according to claim 1 comprising incorporating a dye composition into paper stock and forming paper from said paper stock.

3. A process according to claim 1 comprising applying a dye composition to paper sheet.

4. A process according to claim 1 wherein said dye is a dye of the formula

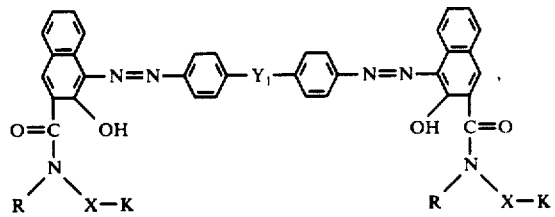

wherein
each R is independently hydrogen or methyl,
each X is independently straight or branched chain alkylene of 1 to 3 carbon atoms,
$Y_1$ is straight or branched chain alkylene of 1 to 4 carbon atoms,
each K is independently

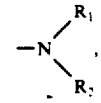

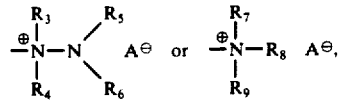

wherein
each $R_1$ and $R_2$ is independently hydrogen, alkyl of 1 to 4 carbon atoms or alkyl of 1 to 4 carbon atoms substituted by chloro, hydroxy, cyano or phenyl or
$R_1$ and $R_2$ taken together and with the nitrogen atom to which they are joined are pyrrolidino, piperidino, morpholino, aziridino or piperazino, each $R_3$, $R_4$, $R_7$, $R_8$ and $R_9$ is independently alkyl of 1 to 4 carbon atoms or alkyl of 1 to 4 carbon atoms substituted by chloro, hydroxy, cyano or phenyl or $R_3$ and $R_4$ taken together and with the nitrogen atom to which they are joined are pyrrolidinium, piperidinium, morpholinium, aziridinium or piperazinium or $R_7$ and $R_8$ taken togethe and with the nitrogen atom to which they are joined are pyrrolidinium, piperidinium, morpholinium, aziridinium or piperazinium or $R_7$, $R_8$ and $R_9$ taken together and with the nitrogen atom to which they are joined are pyridinium or

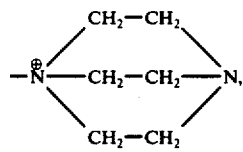

each $R_5$ and $R_6$ is independently hydrogen, alkyl of 1 to 4 carbon atoms or alkyl of 1 to 4 carbon atoms substituted by chloro, hydroxy, cyano or phenyl, and each $A^-$ is independently an anion.

5. A process according to claim 4 comprising incorporating a dye composition into paper stock and forming paper from said paper stock.

6. A process according to claim 4 comprising applying a dye composition to paper sheet.

7. A process according to claim 4 wherein said dye is a dye of the formula

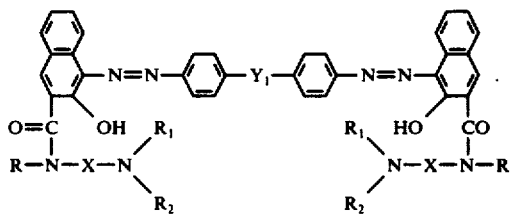

8. A process according to claim 7 wherein $Y_1$ is $-CH_2-$.

9. A process according to claim 8
wherein
each X is independently $-CH_2CH_2-$ or $-CH_2CH_2CH_2-$,
each R is independently hydrogen or methyl, and
each $R_1$ and $R_2$ is independently hydrogen, methyl, ethyl or 2-hydroxyethyl or
$R_1$ and $R_2$ taken together and with the nitrogen atom to which they are joined are pyrrolidino.

10. A process according to claim 4 wherein said dye is a dye of the formul

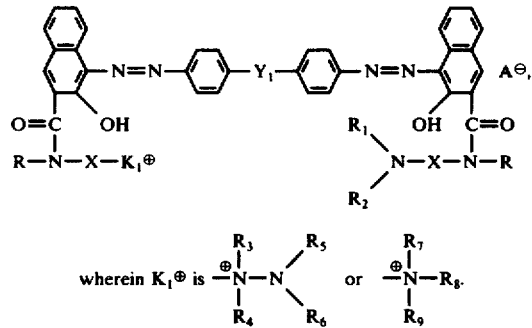

11. A process according to claim 10 wherein $Y_1$ is $-CH-$.

12. A process according to claim 11
wherein each
each X is independently $-CH_2CH_2-$ or $-CH_2CH_2CH_2-$,
each R is hydrogen,
each of $R_1$ and $R_2$ is independently hydrogen, methyl or 2-hydroxyethyl or
$R_1$ and $R_2$ taken together and with the nitrogen atom to which they are joined are pyrrolidino,
each of $R_3$, $R_4$, $R_7$, $R_8$ and $R_9$ is methyl or $R_7$, $R_8$ and $R_9$ taken together and with the nitrogen atom to which they are joined are pyridinium, and
each of $R_5$ and $R_6$ is hydrogen.

13. A process according to claim 4 wherein said dye is a dye of the formula

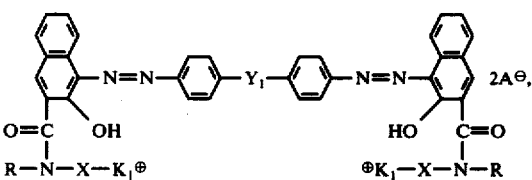

wherein each $K_1^\oplus$ is independently 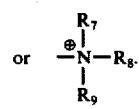

14. A process according to claim 13 wherein $Y_1$ is $-CH_2-$.

15. A process according to claim 14
wherein
each X is independently $-CH_2CH_2-$ or $-CH_2CH_2CH_2-$,
each R is independently hydrogen or methyl,
each $R_3$ and $R_4$ is methyl,
each $R_5$ and $R_6$ is hydrogen, and
each $R_7$, $R_8$ and $R_9$ is independently methyl, ethyl or 2-hydroxyethyl or
$R_7$ and $R_8$ taken together and with the nitrogen atom to which they are joined are pyrrolidinium or piperidinium or
$R_7$, $R_8$ and $R_9$ taken together and with the nitrogen atom to which they are joined are pyridinium.

16. A process according to claim 15
wherein
each X is $-CH_2CH_2-$ or $-CH_2CH_2CH_2-$,
each R is hydrogen or methyl,
each $R_7$ is independently methyl, ethyl or 2-hydroxyethyl, and
each $R_8$ and $R_9$ is independently methyl or ethyl or
$R_7$ and $R_8$ taken together and with the nitrogen atom to which they are joined are pyrrolidinium or piperidinium or
$R_7$, $R_8$ and $R_9$ taken together and with the nitrogen atom to which they are joined are pyridinium.

17. A process according to claim 16 comprising incorporating a dye composition into paper stock and forming paper from said paper stock.

18. A process according to claim 16 comprising applying a dye composition to paper sheet.